United States Patent
Soma

(10) Patent No.: US 10,693,330 B2
(45) Date of Patent: Jun. 23, 2020

(54) ELECTRIC MOTOR

(71) Applicant: HONDA MOTOR CO., LTD., Tokyo (JP)

(72) Inventor: Shingo Soma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 314 days.

(21) Appl. No.: 15/627,447

(22) Filed: Jun. 20, 2017

(65) Prior Publication Data

US 2017/0373550 A1    Dec. 28, 2017

(30) Foreign Application Priority Data

Jun. 22, 2016 (JP) .................................. 2016-123901

(51) Int. Cl.
| | |
|---|---|
| *H02K 1/14* | (2006.01) |
| *H02K 1/27* | (2006.01) |
| *H02K 21/16* | (2006.01) |
| *H02K 29/03* | (2006.01) |

(52) U.S. Cl.
CPC .......... *H02K 1/2753* (2013.01); *H02K 1/146* (2013.01); *H02K 1/2766* (2013.01); *H02K 21/16* (2013.01); *H02K 29/03* (2013.01); *H02K 2213/03* (2013.01)

(58) Field of Classification Search
CPC .... H02K 1/146; H02K 1/2753; H02K 1/2766; H02K 2213/03; H02K 21/16; H02K 29/03
See application file for complete search history.

(56) References Cited

FOREIGN PATENT DOCUMENTS

| | | | |
|---|---|---|---|
| JP | 2002-171730 | 6/2002 | |
| JP | 2002-252947 | 9/2002 | |
| JP | 2004-328956 | 11/2004 | |
| JP | 2005-151774 | 6/2005 | |
| JP | 2005-168183 | 6/2005 | |
| JP | 2008220053 A * | 9/2008 | ........... H02K 1/2766 |
| JP | 2013-099193 | 5/2013 | |
| WO | WO-2008153171 A1 * | 12/2008 | ............. H02K 21/14 |

OTHER PUBLICATIONS

Japanese Office Action for corresponding JP Application No. 2016-123901, dated Dec. 5, 2017.

* cited by examiner

*Primary Examiner* — Ramon M Barrera
(74) *Attorney, Agent, or Firm* — Mori & Ward, LLP

(57) ABSTRACT

An electric motor includes a rotor and a stator core. The rotor has an outer circumferential wall around a rotational axis. The rotor includes a magnet and a groove. The magnet has a magnetic pole center. The groove is provided in the outer circumferential wall to be recessed toward the rotational axis to have a bottom point. An angle between a first virtual line connecting the bottom point of the groove and the rotational axis and a second virtual line connecting the magnetic pole center and the rotational axis viewed along the rotational axis is from 30% to 47% of an electric angle of 90 degrees. The stator core includes an inner circumferential wall. The stator core includes teeth projecting from the inner circumferential wall toward the stator axis. A cross-sectional shape of each teeth includes a first protrusion and a second protrusion.

9 Claims, 10 Drawing Sheets

―●― 4.25　┈●┈ 2.55　―●― 3.2　―●― 2.125　┈●┈ 1.8

TORQUE RIPPLE

AVERAGE TORQUE

―●― 4.25　┈●┈ 2.55　―●― 3.2　―●― 2.125　┈●┈ 1.8

TORQUE RIPPLE

AVERAGE TORQUE

ELECTRIC MOTOR

CROSS-REFERENCE TO RELATED APPLICATIONS

The present application claims priority under 35 U. S. C. § 119 to Japanese Patent Application No. 2016-123901, filed Jun. 22, 2016. The contents of this application are incorporated herein by reference in their entirety.

BACKGROUND OF THE INVENTION

Field of the Invention

The present invention relates to an electric motor.

Discussion of the Background

In the past, an electric motor is known, which includes a stator having a plurality of winding phases formed by distributed windings and a rotor having a plurality of magnetic poles and having an outer circumference facing the stator, wherein grooves are formed in the outer circumference of the rotor, and a straight line of the groove that connects the bottom point having the deepest depth from the outer circumference surface and the center of the rotor forms an electrical angle of equal to or more than 40 degrees and less than 44 degrees with respect to the center line of the magnetic pole closest to the bottom point.

SUMMARY

According to one aspect of the present invention, an electric motor includes a rotor and a stator core. The rotor includes a permanent magnet. The stator core is formed in an annular shape enclosing the rotor and includes a plurality of tooth portions projecting toward the rotor. On an outer circumference of the rotor, a groove portion recessed in a radial direction of the rotor is formed in a cross section perpendicular to the axial direction of the rotor. An angle formed by a virtual line connecting a bottom point of the groove portion and a center of the rotor and another virtual line connecting a magnetic pole center closest to the bottom point and the center of the rotor is an angle from 30% to 47% or less when an electric angle of 90 degrees is defined as 100%. The tooth portion includes stator protrusion portions protruding to both sides in a circumferential direction of the rotor at a tip portion and holding a wound coil. A width of the stator protrusion portion in the circumferential direction of the rotor is narrower at an inside of the radial direction than an outside of the radial direction.

According to another aspect of the present invention, an electric motor includes a rotor and a stator core. The rotor rotatable around a rotational axis. The rotor has an outer circumferential wall around the rotational axis. The rotor includes a magnet and a groove. The magnet is provided at a periphery around the outer circumferential wall and has a magnetic pole center. The groove is provided in the outer circumferential wall to be recessed toward the rotational axis to have a bottom point deepest toward the rotational axis viewed along the rotational axis. An angle between a first virtual line connecting the bottom point of the groove and the rotational axis and a second virtual line connecting the magnetic pole center and the rotational axis viewed along the rotational axis is from 30% to 47% of an electric angle of 90 degrees. The stator core includes an inner circumferential wall which is provided around a stator axis and which surrounds the outer circumferential wall of the rotor so that the rotational axis and the stator axis are substantially coaxial. The stator core includes teeth projecting from the inner circumferential wall toward the stator axis. Each of the teeth has a cross-sectional shape viewed along the stator axis. The cross-sectional shape includes a first side, a second side, a tip end side, a first protrusion, and a second protrusion. The first side extends from the inner circumferential wall toward the stator axis. The second side is opposite to the first side in a circumferential direction around the stator axis. The second side extends from the inner circumferential wall toward the stator axis. The tip end side is opposite to the inner circumferential wall. The tip end side connects the first side and the second side. The first protrusion protrudes from the first side in the circumferential direction. A length of the first protrusion in the circumferential direction decreases toward the stator axis. The second protrusion protrudes from the second side in the circumferential direction. A length of the second protrusion in the circumferential direction decreases toward the stator axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
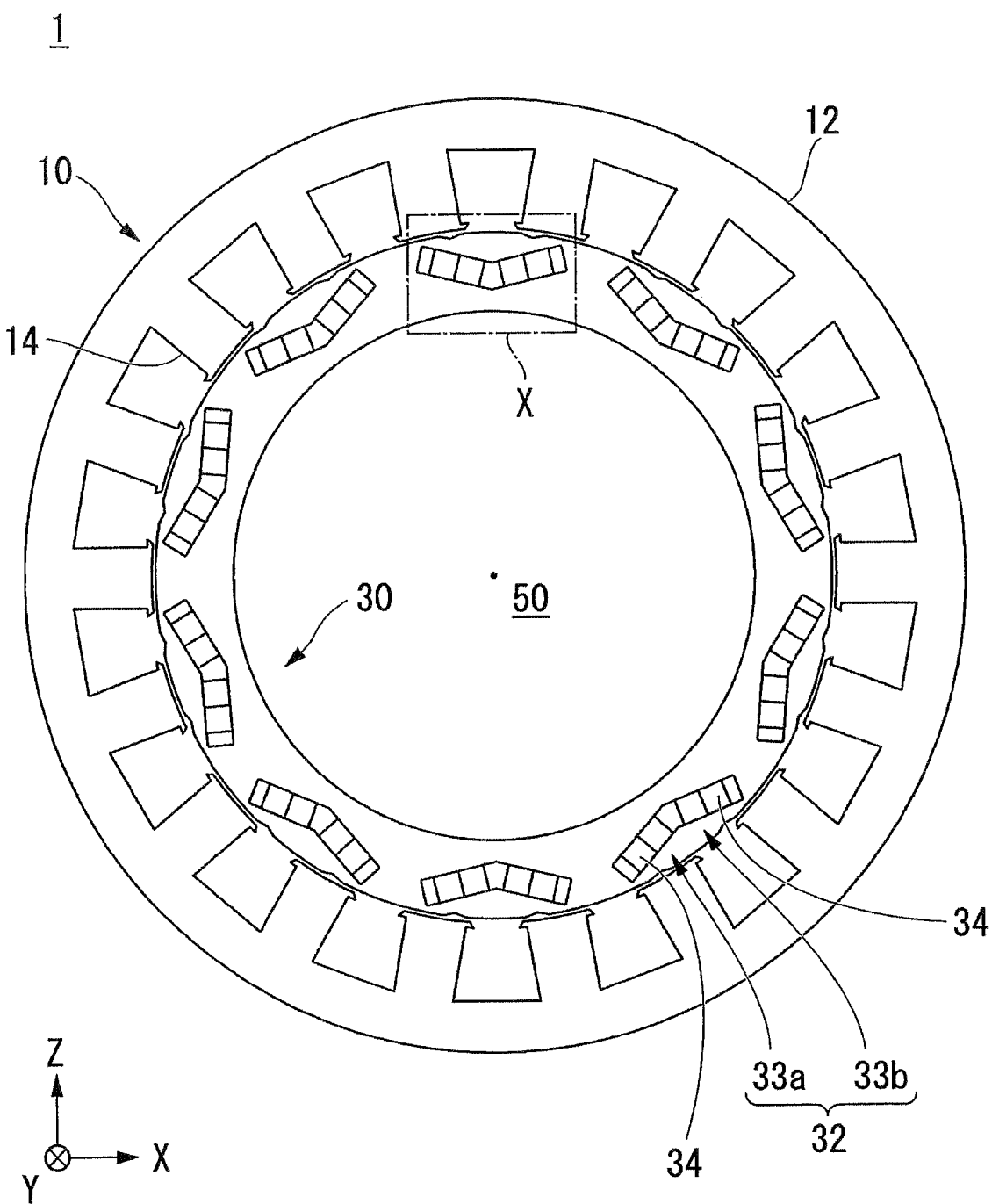
FIG. 1 is a cross-sectional view illustrating an electric motor in a plane perpendicular to an axis of a rotation shaft of the electric motor.

The embodiments will now be described with reference to the accompanying drawings, wherein like reference numerals designate corresponding or identical elements throughout the various drawings.

Hereinafter, an embodiment of electric motors according to the present invention will be described with reference to drawings. Hereinafter, explanation will be made using an XYZ coordinate as necessary.

FIG. 1 is a cross-sectional view illustrating an electric motor 1 in a plane perpendicular to an axis of a rotation shaft 50 of the electric motor (motor) 1. Hereinafter, unless otherwise specified, it is described as a section in a plane perpendicular to the axis of the rotation shaft 50 of the electric motor (motor) 1. The electric motor 1 is, for example, a permanent magnet-type motor. The electric motor 1 is provided on, for example, automobiles such as two-wheeled vehicles, three-wheeled vehicles, and four-wheeled vehicles. This automobile is hybrid automobiles and the like (for example, small hybrid automobiles and the like) including an electric motor 1 and, for example, an engine (internal combustion engine) as multiple driving sources for outputting cruising driving force. This hybrid automobile runs using the power output by, for example, the electric motor 1.

The electric motor 1 has a stator 10 and a rotor 30. The rotor 30 is fixedly connected to the rotation shaft 50 which is an input and output shaft.

The stator 10 has a cylindrical stator core 12 including multiple tooth portions 14. The stator core 12 (stator core) is formed in an annular shape surrounding the rotor 30. The stator core 12 is provided with the multiple tooth portions 14 projecting radially toward the inside (toward the rotor 30) with a regular interval.

Each tooth portion 14 has a substantially rectangular pillar shape. The multiple tooth portions 14 include, for example, the same number of tooth portions corresponding to three phases, i.e., U phase, V phase, and W phase. For example, in the present embodiment, 18 tooth portions 14 are provided. The stator 10 generates a rotating magnetic field for rotating the rotor 30 by the current supplied from another device.

The rotor 30 is arranged inside the stator 10. The rotor 30 rotates in accordance with the rotating magnetic field generated by the stator 10. The rotor 30 is formed in a cylindrical or polygonal columnar shape. The rotor 30 is provided with magnet insertion holes 32 with a regular interval in the direction around the axial center. The magnet insertion hole 32 includes a pair of a magnet insertion hole piece 33a and a magnet insertion hole piece 33b which are divided in a circumferential direction. The magnet insertion hole pieces 33a, 33b are attached with permanent magnets 34. The outer circumference surfaces of the magnet insertion hole piece 33a and the magnet insertion hole piece 33b adjacent to each other in the circumferential direction are substantially in a V shape in the cross section so as to form an angle of less than 180 degrees.

Figure 2:
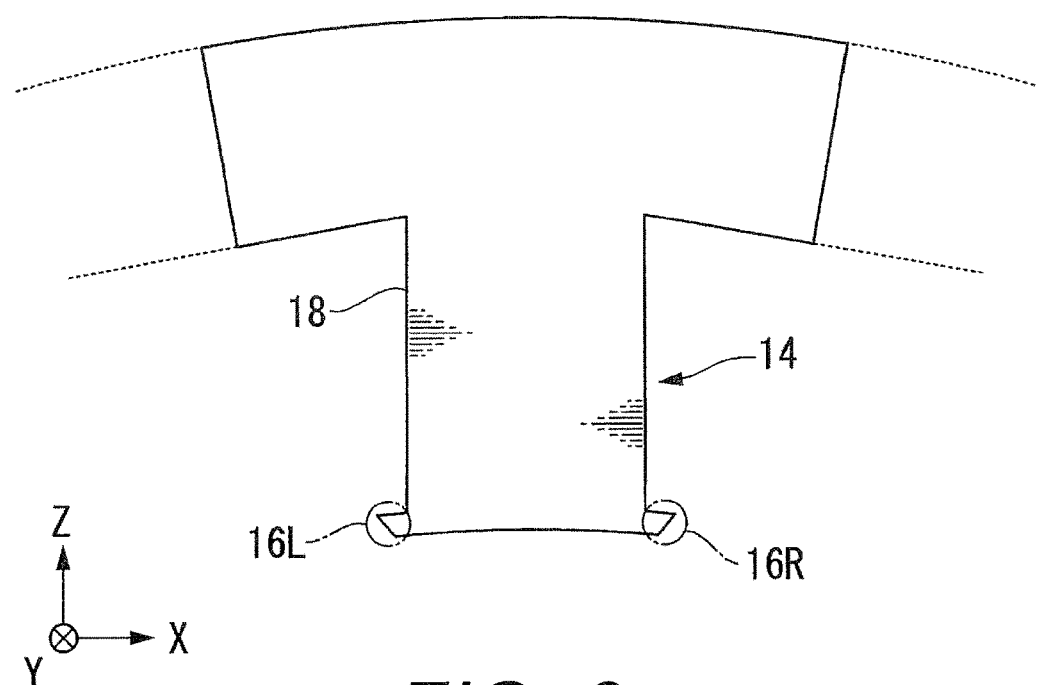
FIG. 2 is an enlarged view illustrating a tooth portion in the cross section of the electric motor.

FIG. 2 is an enlarged view illustrating a tooth portion 14 in the cross section of the electric motor 1. The tooth portion 14 is provided with a protrusion portion 16 for holding a wound coil. The protrusion portions 16 protrude to both sides in the circumferential direction of the rotor 30 at the tip portion (at the inside in the radial direction). The areas surrounded by the dotted lines in the figure correspond to a protrusion portion 16R or a protrusion portion 16L. For example, the protrusion portions 16 are integrally made of the same material as the tooth portion 14.

Figure 3:
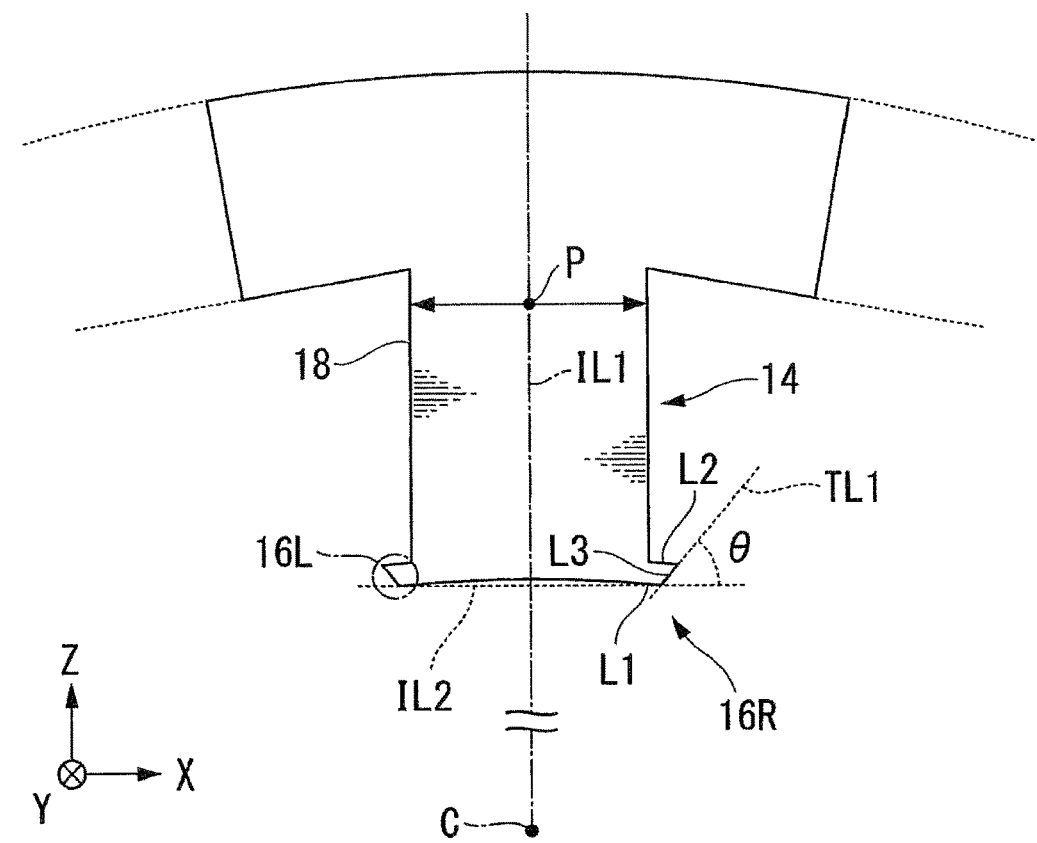
FIG. 3 is a cross-sectional view for explaining a protrusion portion in details.

The width of the protrusion portion 16 in the circumferential direction of the rotor 30 is narrower at the inside of the radial direction than the outside of the radial direction. FIG. 3 is a cross-sectional view for explaining the protrusion portion 16 in details. The protrusion portion 16 includes a first surface L1, a second surface L2, and a third surface L3 (a side surface of the protrusion portion). The first surface L1 is a surface extending in the circumferential direction at the tip portion of a base portion 18 of the tooth portion 14. The second surface L2 is a surface extending in the circumferential direction at a position radially outside of the first surface L1. The third surface L3 is a surface connecting the first surface L1 and the second surface L2.

A line connecting a center P in the circumferential direction of the base portion 18 and a center C of the rotor 30 is defined as a first virtual line IL1. A line perpendicular to this first virtual line IL1 is defined as a second virtual line IL2. An angle $\theta$ of the external angle formed by the second virtual line IL2 and a tangential line TL1 in contact with the third surface L3 is 50 degrees or more and less than 90 degrees.

Figure 4:
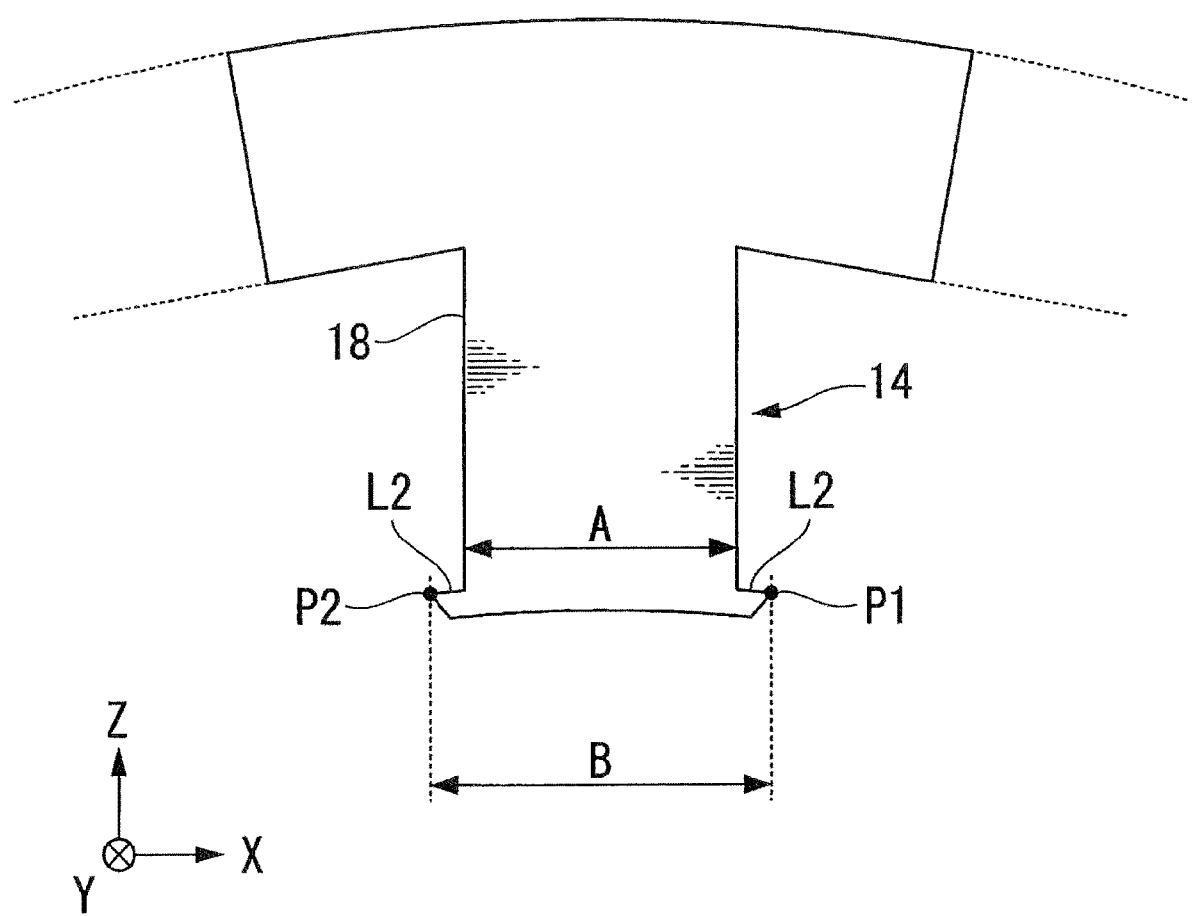
FIG. 4 is a cross-sectional view for explaining a width and another width.

A ratio B/A, which is a ratio of a width B including the tooth portion 14 and the stator protrusion portions 16 with respect to a width A of the base portion 18 of the tooth portion 14, is within a range from 1.25 to 1.35. FIG. 4 is a cross-sectional view for explaining the width A and the width B. The width A of the base portion 18 is a width of the base portion 18 of the tooth portion 14 in the circumferential direction. The width B is the maximum width including the tooth portion 14 and the two protrusion portions 16 that exist in the circumferential direction of the tooth portion 14. More specifically, the width B is a length between positions P1 and P2 of the intersection lines when the second surface L2 and the third surface L3 intersect each other.

Figure 5:
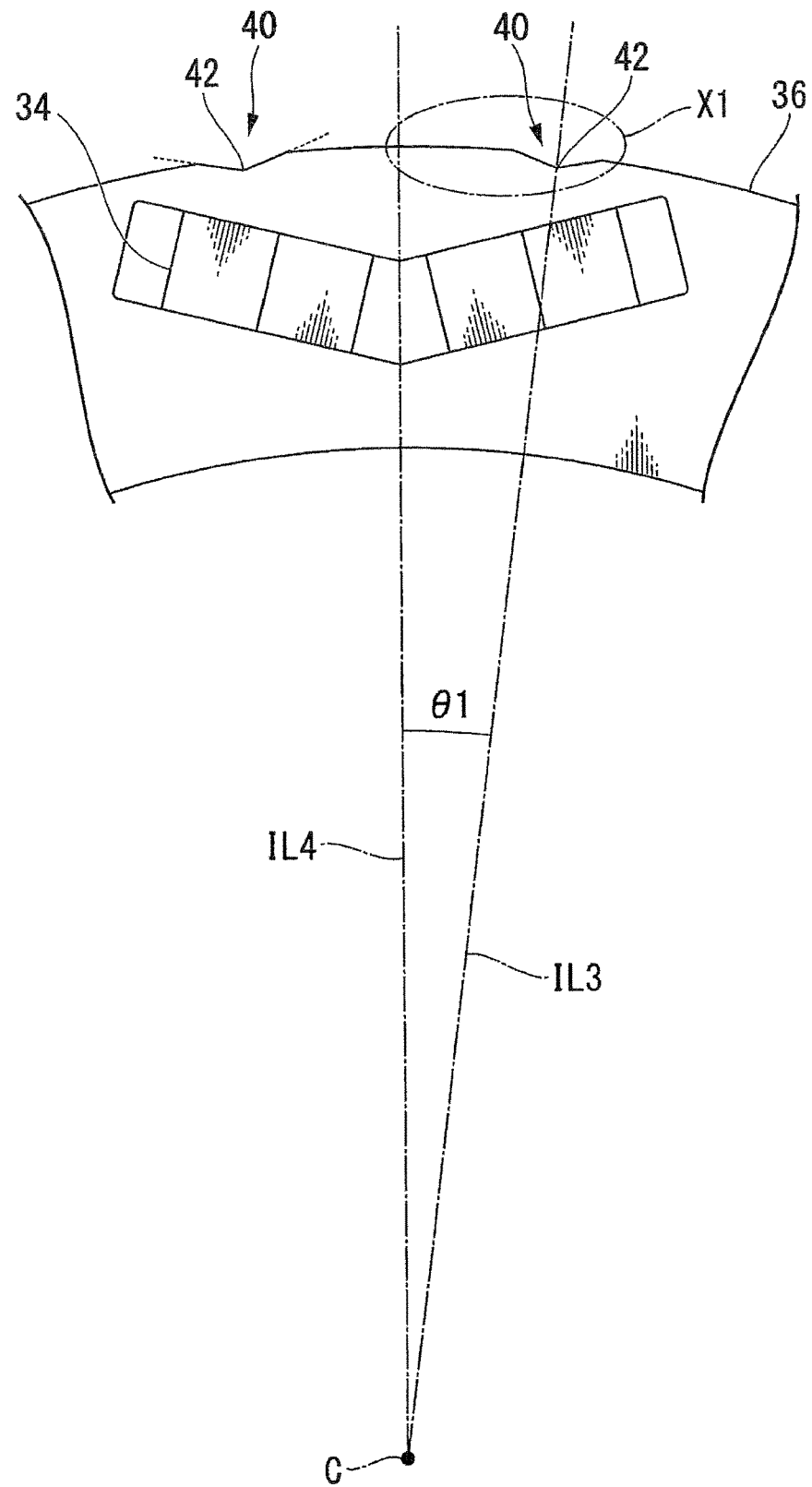
FIG. 5 is an enlarged view illustrating an area X illustrated in FIG. 1.

FIG. 5 is an enlarged view illustrating an area X illustrated in FIG. 1. Multiple groove portions 40 recessed in the radial direction of the rotor 30 are formed in an outer circumference wall 36 of the rotor. Where the electric angle of 90 degrees is defined as 100%, the groove portion 40 is set so that an angle $\theta 1$ formed by a third virtual line IL3 connecting the deepest bottom point 42 of the groove portion and the center C of the rotor 30 and a fourth virtual line IL4 connecting the magnetic pole center closest to the bottom point 42 and the center of the rotor 30 is an angle from about 30% (27 degrees) to 47% (42.3 degrees). In a case where the poles of the electric motor 1 include six pairs of poles, an angle of 30% to 47% in the electric angle is equivalent to about 5 to 7 degrees in the mechanical angle. In a case where the poles of the electric motor 1 include eight pairs of poles, an angle of 30% to 47% in the electric angle is equivalent to about 3.75 to 5.25 degrees in the mechanical angle. Where the electric angle of 90 degrees is defined as 100%, the angle $\theta 1$ may be set to an angle from about 30% (27 degrees) to 45% (39.6 degrees).

Figure 6:
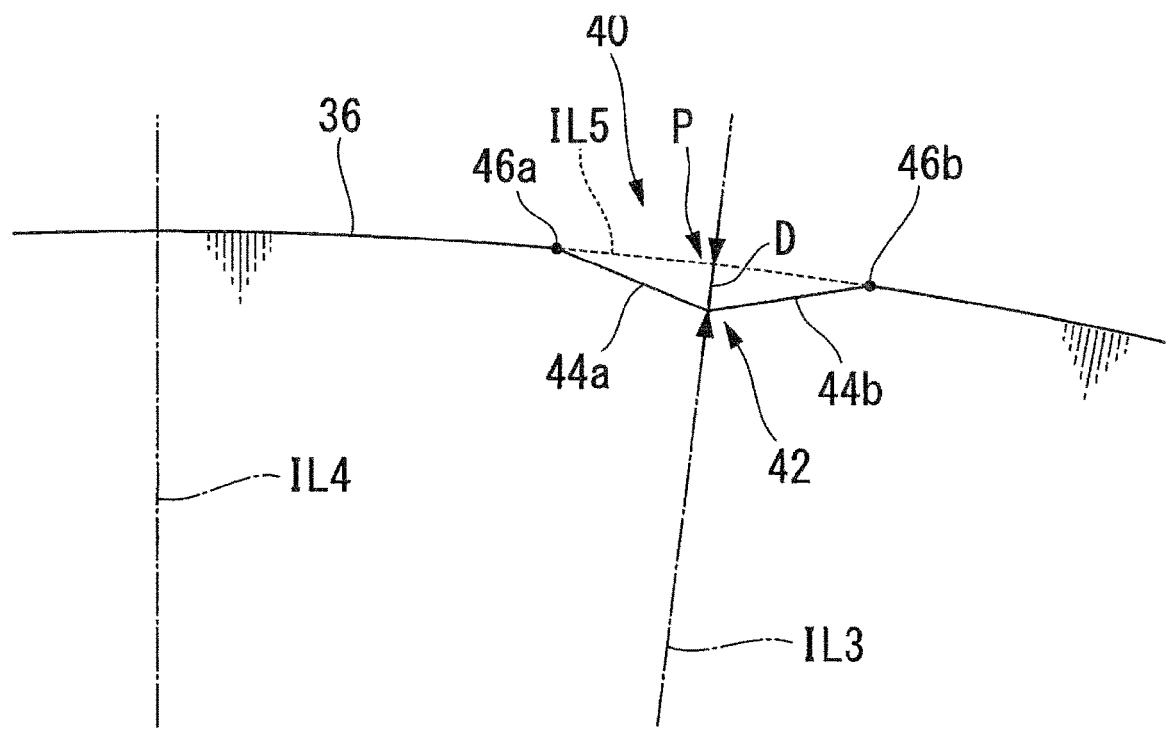
FIG. 6 is an enlarged view illustrating an area X1 illustrated in FIG. 5.

FIG. 6 is an enlarged view illustrating an area X1 illustrated in FIG. 5. The groove portion 40 is formed with two groove surfaces 44a and 44b in a circumferential direction with the bottom point 42 being the center. A base point 46a is provided between the outer circumference wall 36 and the groove surface 44a, and a base point 46b is provided between the outer circumference wall 36 and the groove surface 44b. Hereinafter, when the groove surfaces 44a and 44b are not distinguished from each other, the groove surfaces will be referred to as a groove surface 44, and when the base point 46a and the base point 46b are not distinguished from each other, the base points will be referred to as a base point 46.

The groove surface 44 is a surface connecting the base point 46 in contact with the outer circumference wall 36 and the bottom point 42. A line virtually connecting the two base points (46a, 46b) of the groove portion 40 in contact with the outer circumference wall 36 with the same curvature as the curvature of the outer circumference wall 36 is defined as an outer circumference wall virtual line IL5. In the third virtual line IL3, the length from the bottom point 42 to the outer circumference wall virtual line IL5 is the depth D of the groove portion 40. Where the length of the groove surface 44a or the groove surface 44b is set to a length between a and 1.2a, the depth D is set to a depth between 0.3a and 0.4a. "a" is any given natural number.

Figure 7:
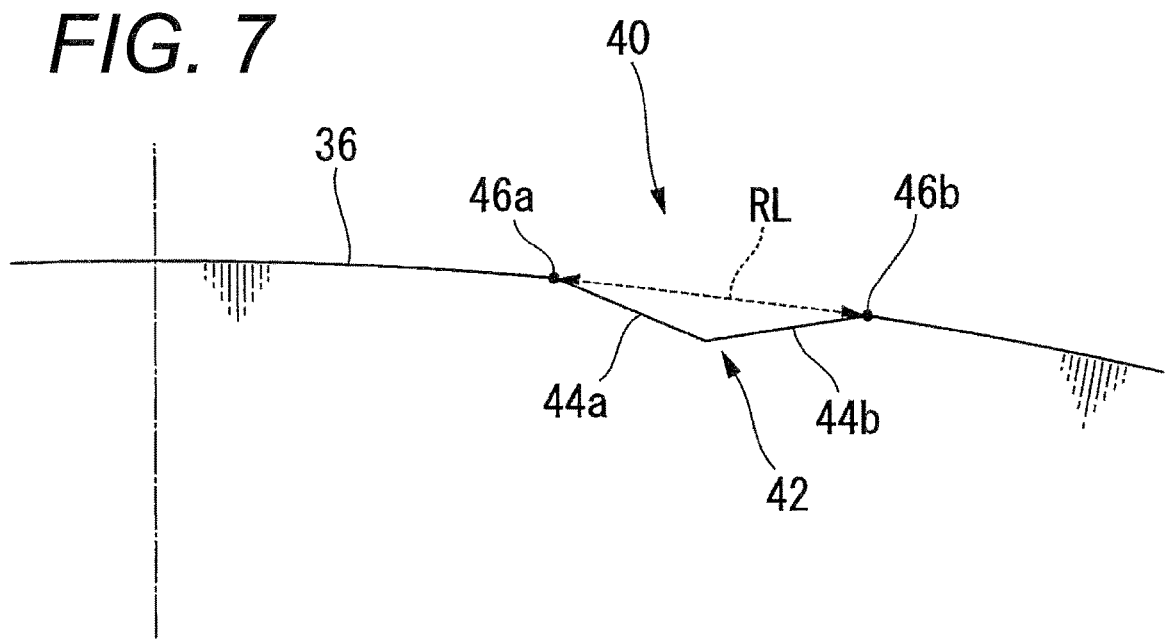
FIG. 7 is a view for explaining a base point length.

"Width B/base point length" which is the ratio between the length (base point length) obtained by connecting the base point 46a and the base point 46b with a straight line and the width B described in FIG. 4 is set to 2.125 or more and 2.55 or less. FIG. 7 is a view for explaining a base point length RL. The "base point length" is an example of "width C in circumferential direction in V shape".

Figure 8A:
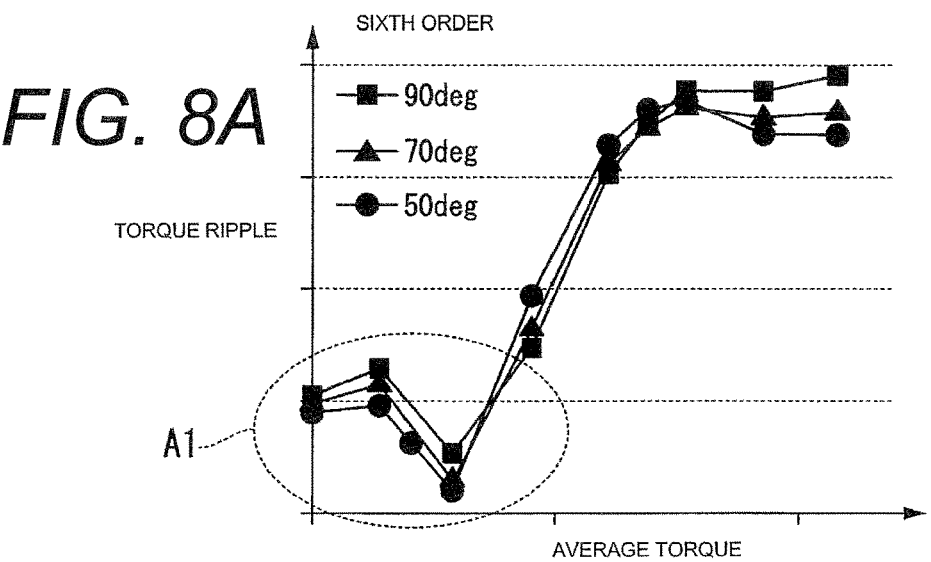
FIGS. 8A to 8C are graphs illustrating a relationship among an angle, an average torque, and a torque ripple.
Figure 8B:
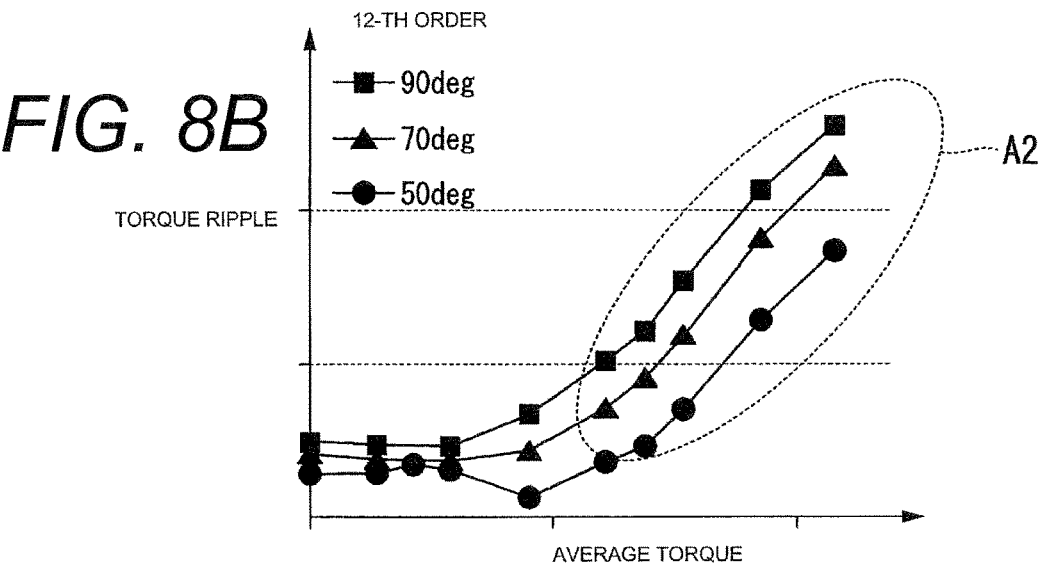
Figure 8C:
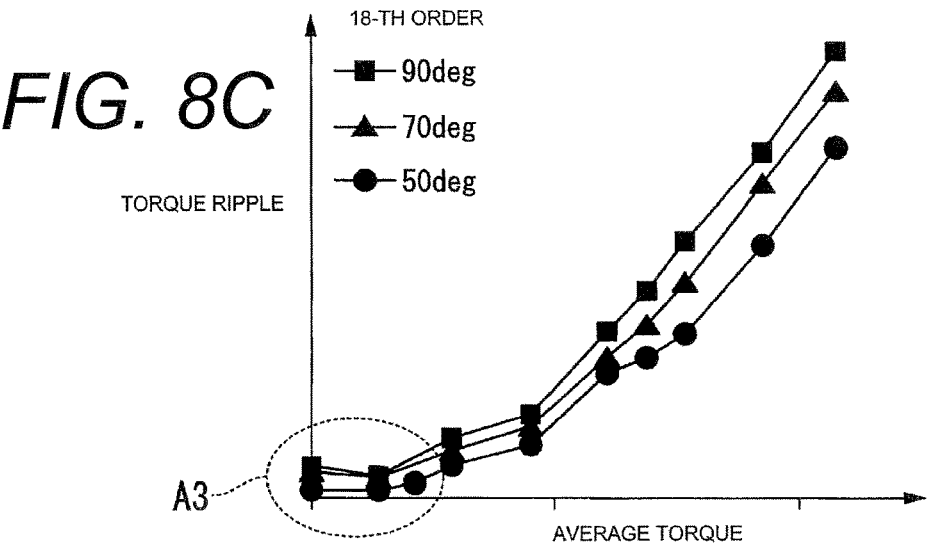

FIGS. 8A to 8C are graphs illustrating a relationship among an angle θ, an average torque, and a torque ripple. Displacement of the torque ripple will be explained in the case where the angle θ between the second virtual line IL2 and the tangential line TL1 in contact with the third surface L3 is set to 90 degrees, 70 degrees, and 50 degrees. The horizontal axis indicates the average torque output from the electric motor 1, and the vertical axis indicates the torque ripple. FIG. 8A illustrates a result of the sixth order component (of electrical rotation frequency) with respect to the torque ripple. FIG. 8B illustrates a result of the 12-th order component with respect to the torque ripple. FIG. 8C illustrates a result of the 18-th order component with respect to the torque ripple.

For example, as shown in FIG. 8A, when the average torque is small (A1 in FIG. 8A), the torque ripple of the sixth order component at the angle θ of 50 degrees or 70 degrees is more greatly suppressed than the torque ripple at the angle θ of 90 degrees. For example, as shown in FIG. 8B, when the average torque is a middle level to a larger level (A2 in FIG. 8B), the torque ripple of the 12-th order component at the angle θ of 50 degrees or 70 degrees is more greatly suppressed than the torque ripple at the angle θ of 90 degrees. For example, as shown in FIG. 8C, when the average torque is small (A3 in FIG. 8C), the torque ripple of the 18-th order component at the angle θ of 50 degrees or 70 degrees is more greatly suppressed than the torque ripple at the angle θ of 90 degrees.

As described above, when the angle θ is set to less than 90 degrees, the torque ripple can be more greatly suppressed than the case where the angle θ is set to 90 degrees or more.

Figure 9:
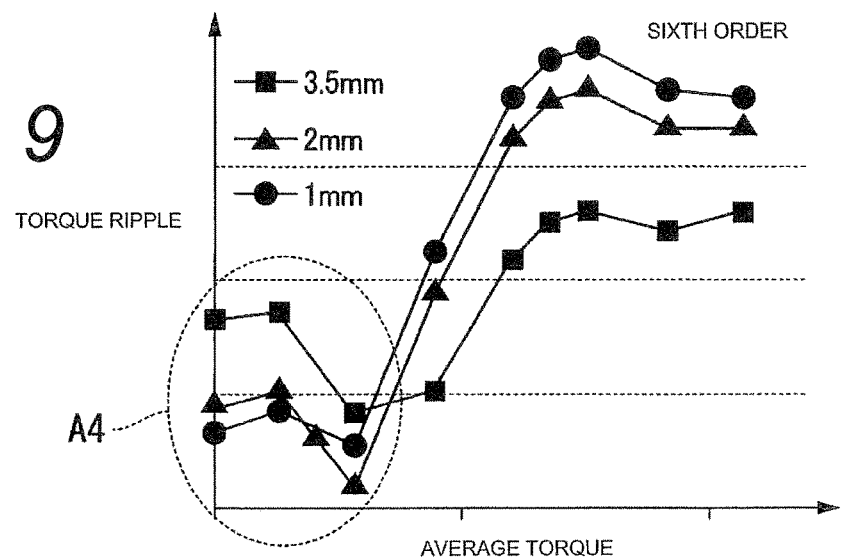
FIG. 9 is a graph illustrating a relationship among a depth of a groove portion, an average torque, and a torque ripple.

FIG. 9 is a graph illustrating a relationship among the depth D of the groove portion 40, the average torque, and the torque ripple. The example shown in FIG. 9 illustrates the torque ripple with respect to the average torque in the case where the depth D of the groove portion 40 is set to 3.5 mm, 2 mm, and 1 mm. In the example shown in FIG. 9, the bottom point 42 of the groove portion 40 is configured to be in the V shape, and the position of the V shape is defined as θ1, and the angle is set to a mechanical angle of 6.4 degrees (an electric angle of 38.4 degrees).

FIG. 9 illustrates a result of the sixth order component with respect to the torque ripple. The horizontal axis of FIG. 9 indicates the average torque that is output from the electric motor 1, and the vertical axis of FIG. 9 indicates the torque ripple. As illustrated in FIG. 9, when the average torque is small (A4 in FIG. 9), the torque ripple generated when the depth D is 2 mm or 1 mm is smaller than that generated when the depth D is 3.5 mm. As described above, when the depth D of the groove portion 40 is configured to be shallow, the torque ripple of the sixth order component can be suppressed.

Figure 10A:
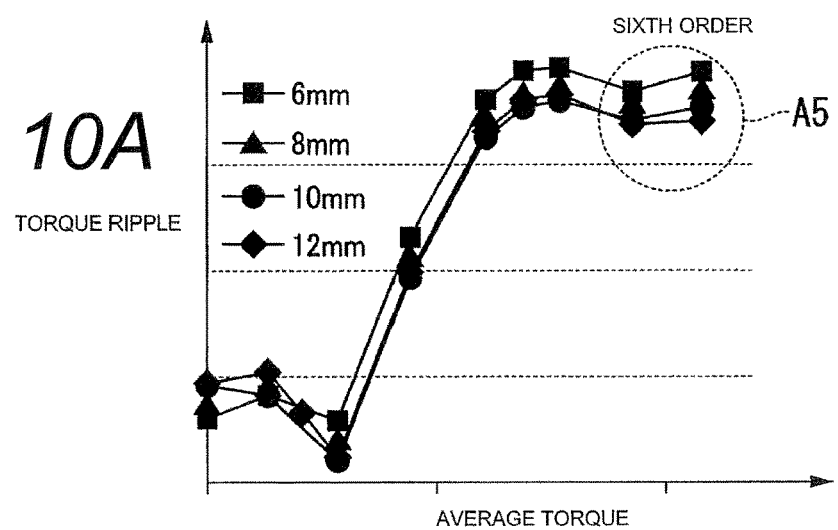
FIGS. 10A and 10B are graphs illustrating a relationship among a length of a groove surface, an average torque, and a torque ripple.
Figure 10B:
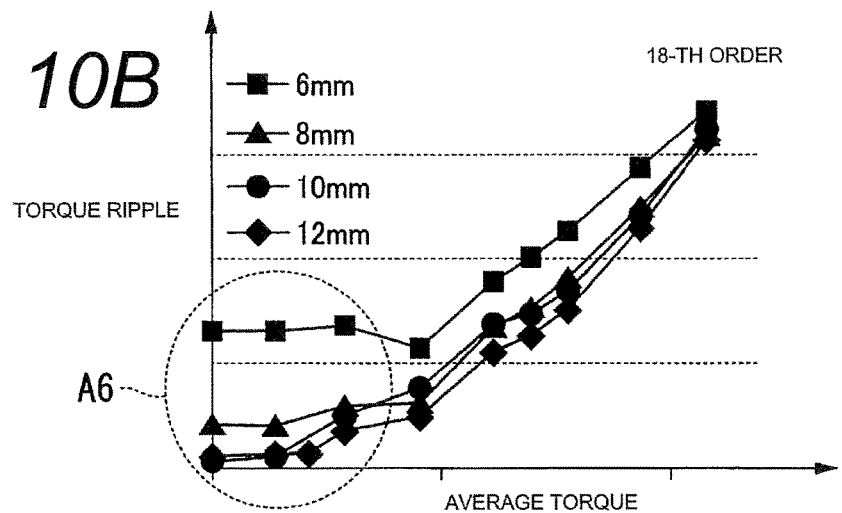

FIGS. 10A and 10B are graphs illustrating a relationship among the length of the groove surface 44, the average torque, and the torque ripple. FIGS. 10A and 10B illustrate the torque ripple with respect to the average torque in the case where the length of the groove surface 44 is set to 6 mm, 8 mm, 10 mm, and 12 mm. The depth of the groove portion 40 is 2 mm, and the other conditions are the same as those of FIG. 9. FIG. 10A illustrates a result of the sixth order component with respect to the torque ripple. FIG. 10B illustrates a result of the 18-th component with respect to the torque ripple.

For example, as illustrated in FIG. 10A, when the average torque is large (A5 in FIG. 10A), the torque ripple of the sixth order component generated when the length of the groove surface 44 is set to 8 mm, 10 mm, or 12 mm is more greatly suppressed than the torque ripple generated when the length of the groove surface 44 is set to 6 mm. For example, as illustrated in FIG. 10B, when the average torque is small (A6 in FIG. 10B), the torque ripple of the 18-th component generated when the length of the groove surface 44 is set to 8 mm, 10 mm, or 12 mm is more greatly suppressed than the torque ripple generated when the length of the groove surface 44 is set to 6 mm.

As described above, the torque ripple can be suppressed by increasing the length of the groove surface 44. In particular, the torque ripple of the 18-th component generated when the average torque is small can be suppressed.

Figure 11A:
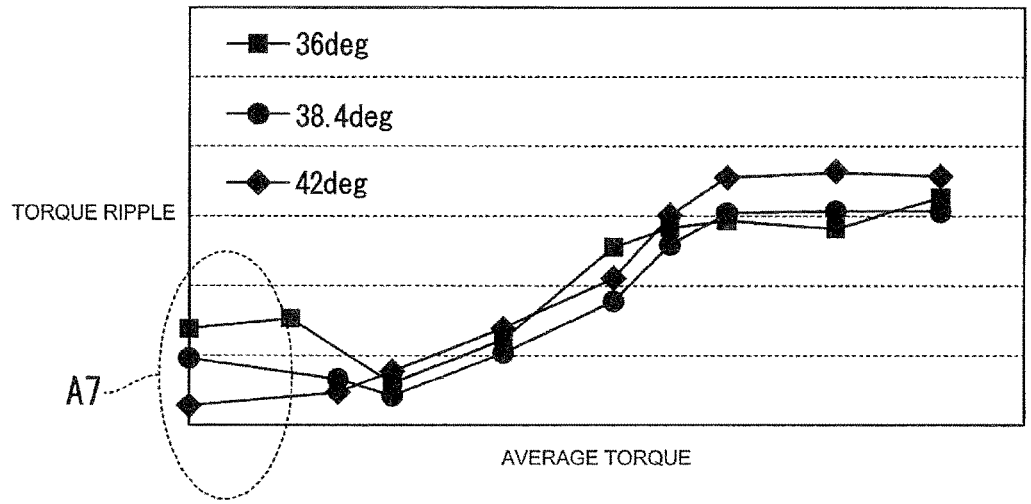
FIGS. 11A to 11C are graphs illustrating a relationship among an angle formed by a third virtual line and a fourth virtual line, an average torque, and a torque ripple.
Figure 11B:
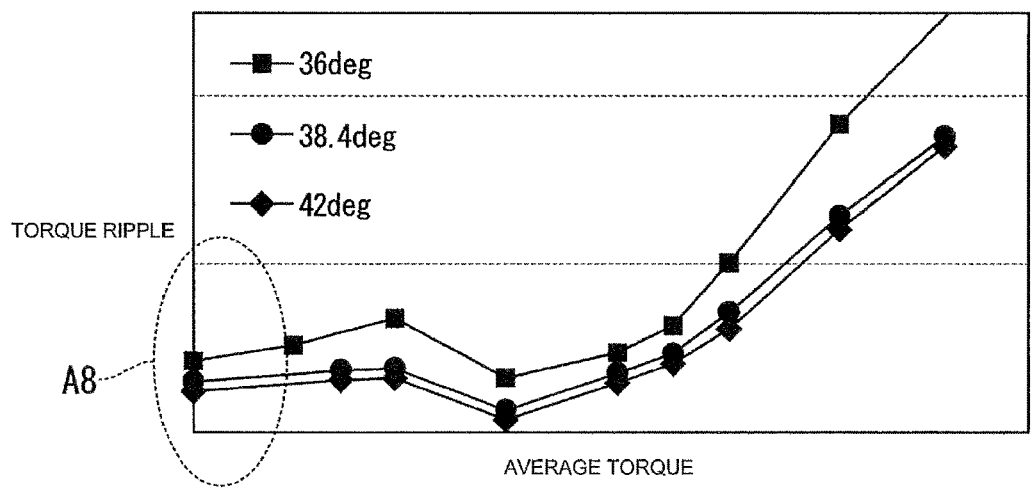
Figure 11C:
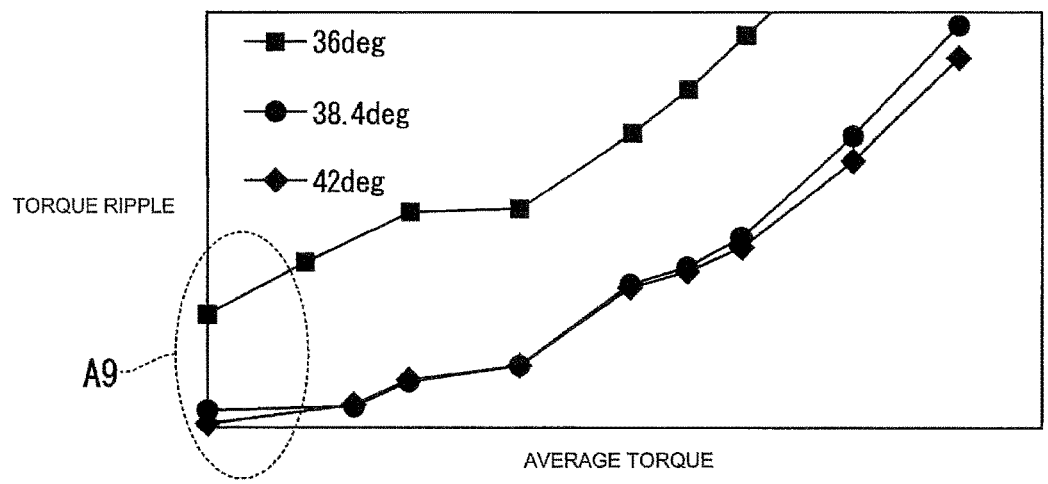

FIGS. 11A to 11C are graphs illustrating a relationship among an angle θ1 formed by the third virtual line IL3 and the fourth virtual line IL4, the average torque, and the torque ripple. The example shown in FIGS. 11A to 11C illustrate the torque ripple with respect to the average torque in the case where the angle θ1 is set to 6 degrees (36 degrees), 6.4 degrees (38.4 degrees), and 7 degrees (42 degrees). The values shown outside of the parentheses indicate the mechanical angles, and the values shown in the parentheses indicate the electric angles. The depth of the groove portion 40 is 2 mm, and the other conditions are the same as the conditions of FIG. 9. FIG. 11A illustrates a result of the sixth order component with respect to the torque ripple. FIG. 11B illustrates a result of the 12-th order component with respect to the torque ripple. FIG. 11O illustrates a result of the 18-th order component with respect to the torque ripple.

For example, as illustrated in FIGS. 11A to 11C, when the average torque is small (A7 to A9 in FIGS. 11A to 11C), the torque ripple generated when the angle θ1 is set to 6.4 degrees or 7 degrees is more greatly suppressed than the torque ripple generated when the angle θ1 is set to 6 degrees. The case where the angle θ1 is set to 7 degrees is more preferable than the case where the angle is set to 6.4 degrees.

Figure 12A:
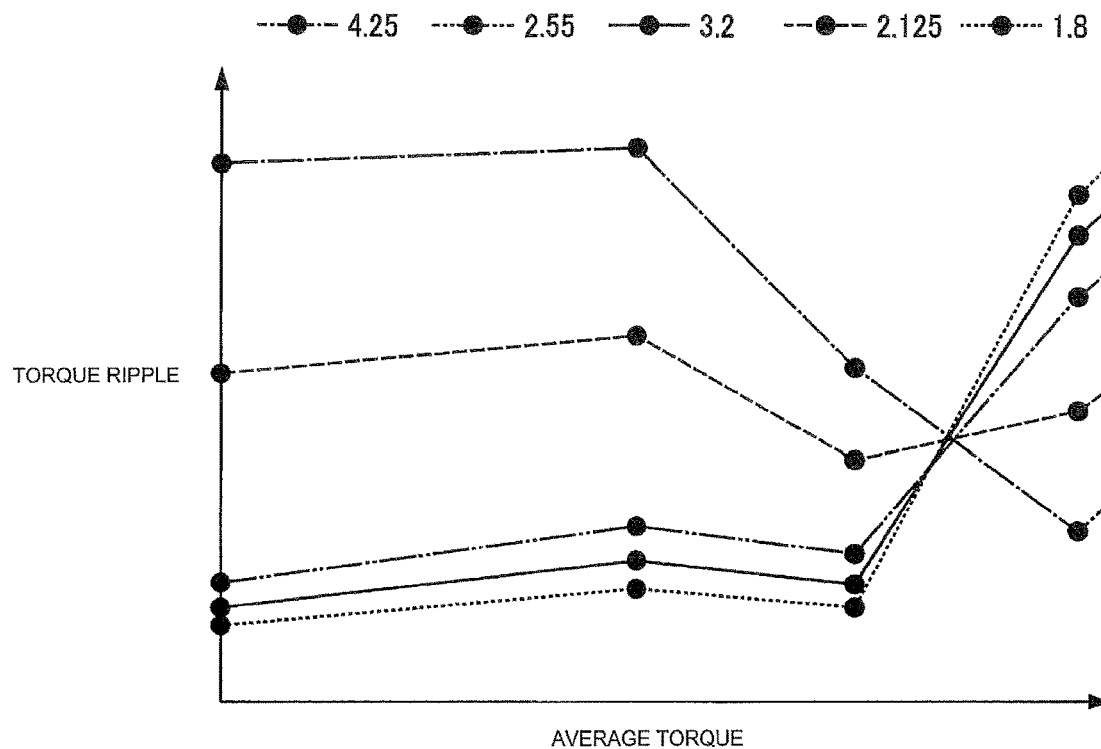
FIGS. 12A and 12B are graphs illustrating a tendency of a torque ripple with respect to an average torque in a case where a ratio between a width and a base point length is changed.

For example, in a hybrid vehicle equipped with the electric motor 1, when the hybrid vehicle starts to move from the stopped state by using the power output from the electric motor 1, the hybrid vehicle is required to suppress the torque ripple of the basic order. In the present embodiment, when the angle θ1 is set to 7 degrees as shown in FIG. 12A, and the average torque is small, the torque ripple of the sixth order component which is the basic order can be suppressed. In this case, the hybrid vehicle becomes a vehicle with excellent vibration and noise characteristics.

Figure 12B:
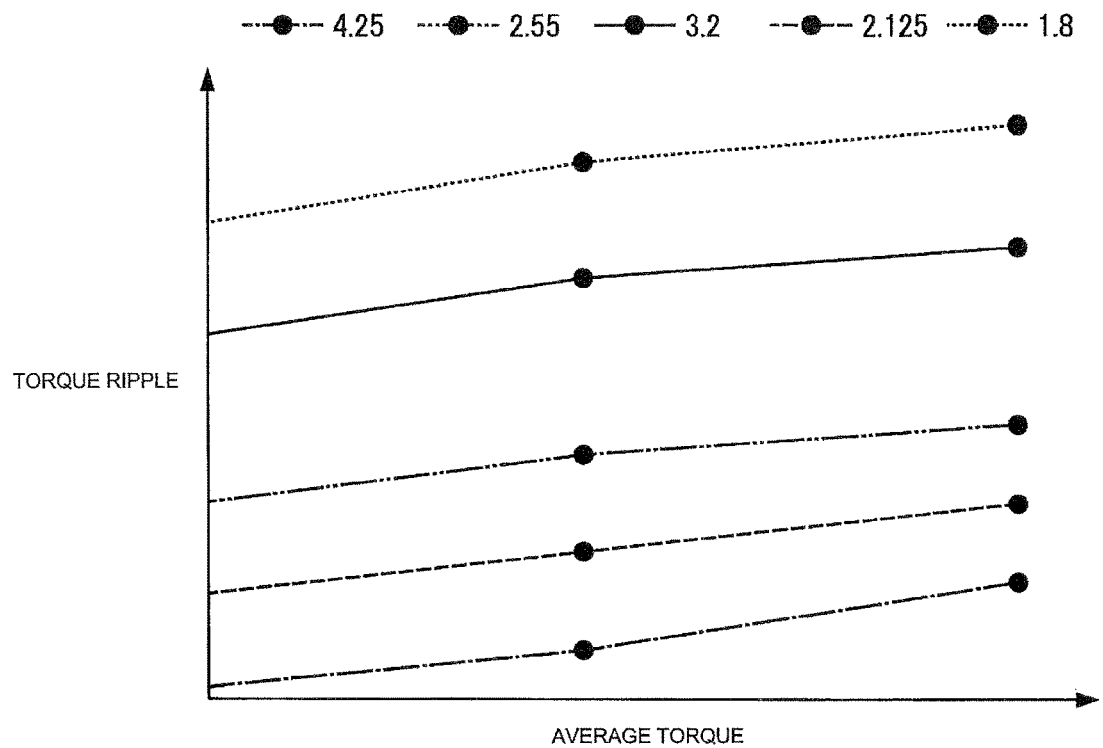

FIGS. 12A and 12B are graphs illustrating a tendency of the torque ripple with respect to the average torque in the case where a ratio between the width B and the base point length RL is changed. The example as illustrated in FIGS. 12A and 12B is a result of the sixth order component with respect to the torque ripple. The horizontal axis indicates the average torque, and the vertical axis indicates the torque ripple. FIG. 12A is a graph illustrating a change in the torque ripple in an area where the average torque is low, i.e., the average torque is zero to a middle level (for example, 30 N/m). FIG. 12B is a graph illustrating a change in the torque ripple with respect to the average torque in an area where the average torque is high (for example, 80 to 110 N/m).

The torque ripple is more greatly suppressed when "width B/base point length RL" is 2.125 or 2.55 than when "width B/base point length RL" is 4.25 in an area where the average torque is low. Further, the torque ripple is more greatly suppressed when "width B/base point length RL" is 2.55 than when "width B/base point length RL" is 2.125. The torque ripple is more greatly suppressed when "width B/base point length RL" is 2.125 or 2.55 than when "width B/base point length RL" is 3.2 or 4.25 in an area where the average torque is high.

In this way, in the area where the average torque is low, the case where "width B/base point length RL" is 2.25 is preferable, and in the area where the average torque is high, the case where "width B/base point length RL" is 2.125 or 2.25 is preferable.

Figure 13A:
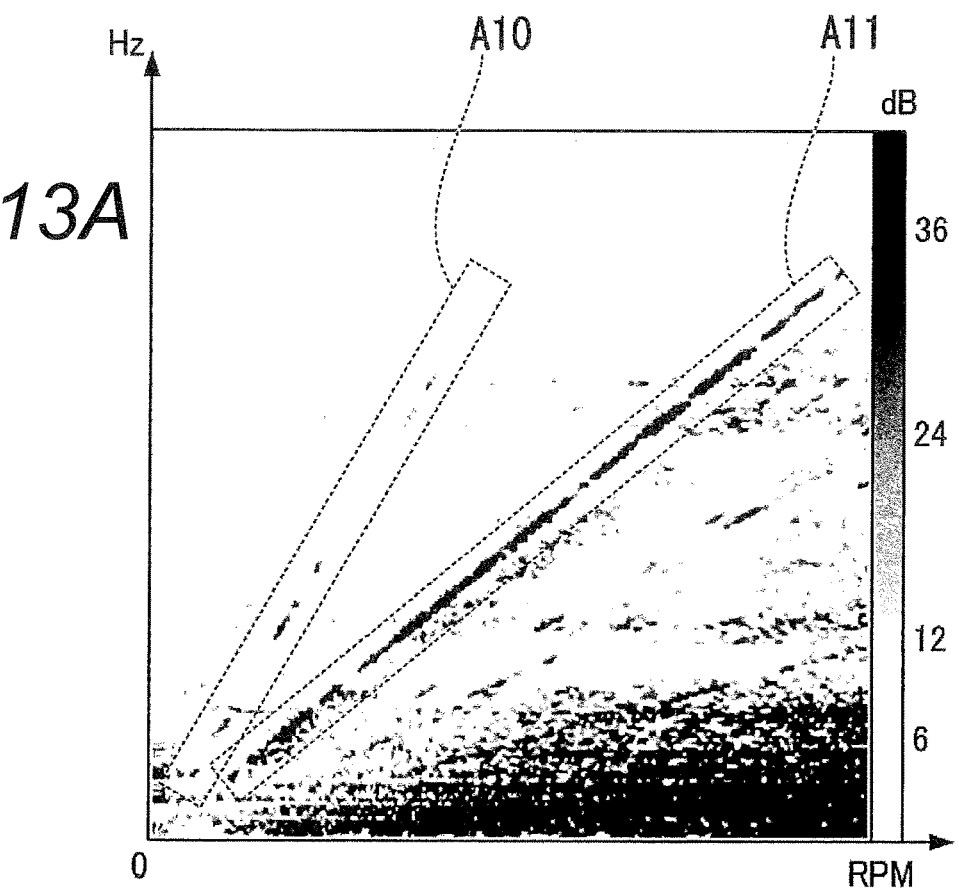
FIGS. 13A and 13B are graphs illustrating a sixth order component of indoor sounds.
Figure 13B:
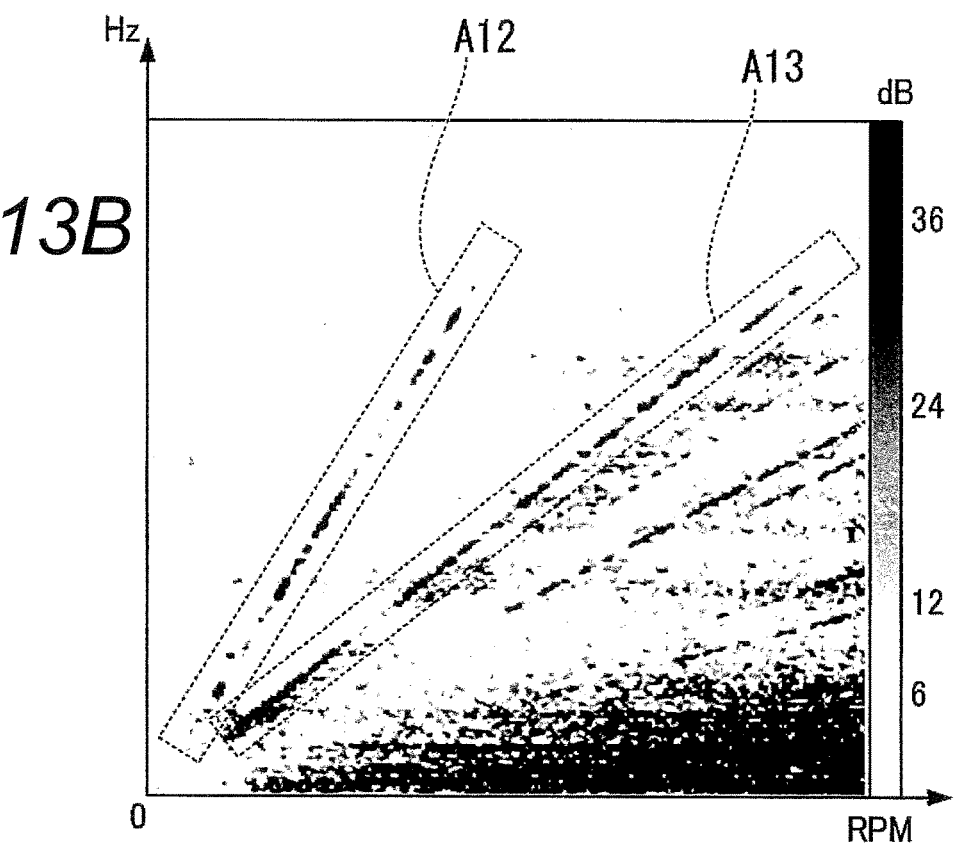

FIGS. 13A and 13B are graphs illustrating a sixth order component of indoor sounds. The example as shown in FIGS. 13A and 13B is a result obtained by installing an electric motor in a vehicle and measuring the strength of sound when the vehicle accelerates from stopped state. FIG. 13A is a graph illustrating indoor sounds of the electric motor that does not employ the protrusion portion 16 and the groove portion 40 according to the present embodiment. FIG. 13B is a graph illustrating indoor sounds of the electric motor 1 that employs the protrusion portion 16 and the groove portion 40 according to the present embodiment. The vertical axis indicates a frequency, and the horizontal axis indicates a rotational speed. Sound intensity (decibel) is shown by shading. A portion indicated with a thicker shading represents a stronger sound, and a brighter portion indicates a weaker sound. An area A10 in FIG. 13A indicates the level of sound of the 12-th order component. An area A11 in FIG. 13A indicates the level of sound of the sixth order component. An area A12 in FIG. 13B indicates the level of sound of the 12-th order component. An area A13 in FIG. 13B indicates the level of sound of the sixth order component. The electric motor 1 according to the present embodiment can suppress the sound level of the sixth order component when the vehicle accelerates from the stopped state.

According to the embodiment explained above, an electric motor 1 includes a rotor including a permanent magnet and a stator core formed in an annular shape enclosing the rotor, and including a plurality of tooth portions projecting toward the rotor, wherein on an outer circumference of the rotor, a groove portion recessed in a radial direction of the rotor is formed in a cross section perpendicular to the axial direction of the rotor, an angle formed by a virtual line connecting a bottom point of the groove portion and a center of the rotor and another virtual line connecting a magnetic pole center closest to the bottom point and the center of the rotor is an angle from 30% to 47% or less when an electric angle of 90 degrees is defined as 100%, the tooth portion includes stator protrusion portions protruding to both sides in the circumferential direction of the rotor at a tip portion and holding a wound coil, and a width of the stator protrusion portion in a circumferential direction of the rotor is narrower at an inside of the radial direction than an outside of the radial direction, so that noises can be efficiently suppressed.

Although the mode for carrying out the present invention have been described above using the embodiment, the present invention is not particularly limited in any way to the embodiment, and various modifications and substitutions can be made within the scope not departing from the gist of the present invention.

According to a first embodiment, there is provided an electric motor (1) including: a rotor (30) including a permanent magnet (34); and a stator core (12) formed in an annular shape enclosing the rotor, and including a plurality of tooth portions (14) projecting toward the rotor, wherein on an outer circumference of the rotor, a groove portion (40) recessed in a radial direction of the rotor is formed in a cross section perpendicular to the axial direction of the rotor, an angle formed by a virtual line (IL3) connecting a bottom point (42) of the groove portion and a center (P) of the rotor and another virtual line (IL4) connecting a magnetic pole center closest to the bottom point and the center of the rotor is an angle from 30% to 47% or less when an electric angle of 90 degrees is defined as 100%, the tooth portion includes stator protrusion portions (16) protruding to both sides in a circumferential direction of the rotor at a tip portion and holding a wound coil, and a width of the stator protrusion portion in the circumferential direction of the rotor is narrower at an inside of the radial direction than an outside of the radial direction.

According to a second embodiment, when a length of one of sides extending from a bottom point of the groove portion to an outer circumference (36) of the rotor is set to a length between a and 1.2a, a depth from an outer circumference surface of the rotor to the bottom point is a depth between 0.3a or more and 0.4a or less.

According to a third embodiment, in a cross section perpendicular to the axial direction, an external angle formed by a virtual line perpendicular to a virtual line connecting a center of the tooth portion in the circumferential direction and a center of the rotor and a tangential line in contact with a side surface of the stator protrusion portion is 50 degrees or more and less than 90 degrees.

According to a fourth embodiment, a ratio B/A, which is a ratio of a width B in the circumferential direction including the tooth portion and the stator protrusion portions with respect to a width A of the tooth portion in the circumferential direction, is within a range from 1.25 or more to 1.35 or less.

According to a fifth embodiment, the groove portion is formed in a V shape, and a ratio B/C, which is a ratio of the width B in the circumferential direction including the tooth portion and the stator protrusion portion with respect to a width C of the V shape in the circumferential direction, is within a range from 2.125 or more to 2.55 or less.

According to the embodiments, an electric motor capable of effectively suppressing noises can be provided.

Obviously, numerous modifications and variations of the present invention are possible in light of the above teachings. It is therefore to be understood that within the scope of the appended claims, the invention may be practiced otherwise than as specifically described herein.

What is claimed is:
1. An electric motor comprising:
a rotor including a permanent magnet; and
a stator core formed in an annular shape enclosing the rotor, and including a plurality of tooth portions projecting toward the rotor,
wherein on an outer circumference of the rotor, a groove portion recessed in a radial direction of the rotor is formed in a cross section perpendicular to the axial direction of the rotor, wherein the tooth portion includes stator protrusion portions protruding to both sides in a circumferential direction of the rotor at a tip portion and holding a wound coil, wherein a ratio B/A, which is a ratio of a width B in the circumferential direction including the tooth portion and the stator protrusion portions with respect to a width A of the tooth portion in the circumferential direction, is within a range from 1.25 or more to 1.35 or less, wherein an angle formed by a virtual line connecting a bottom point of the groove portion and a center of the rotor and another virtual line connecting a magnetic pole center closest to the bottom point and the center of the rotor is an angle from 30% to 47% or less when an electric angle of 90 degrees is defined as 100%, and wherein a width of the stator protrusion portion in the circumferential direction of the rotor is narrower at an inside of the radial direction than an outside of the radial direction.

2. The electric motor according to claim 1, wherein when a length of one of sides extending from a bottom point of the groove portion to an outer circumference of the rotor is set to a length between a and 1.2a, a depth from an outer circumference surface of the rotor to the bottom point is a depth between 0.3a or more and 0.4a or less.

3. The electric motor according to claim 1, wherein in a cross section perpendicular to the axial direction, an external angle formed by a virtual line perpendicular to a virtual line connecting a center of the tooth portion in the circumferential direction and a center of the rotor and a tangential line in contact with a side surface of the stator protrusion portion is 50 degrees or more and less than 90 degrees.

4. The electric motor according to claim 1, wherein the tooth portion has a cross-sectional shape viewed along the stator axis, the cross-sectional shape comprising:
  a first side extending from an inner circumferential wall toward the stator axis;
  a second side opposite to the first side in a circumferential direction around the stator axis, the second side extending from the inner circumferential wall toward the stator axis;
  a first protrusion protruding from the first side in the circumferential direction, a length of the first protrusion in the circumferential direction decreasing toward the stator axis; and
  a second protrusion protruding from the second side in the circumferential direction, a length of the second protrusion in the circumferential direction decreasing toward the stator axis.

5. An electric motor comprising:
  a rotor including a permanent magnet; and
  a stator core formed in an annular shape enclosing the rotor, and including a plurality of tooth portions projecting toward the rotor,
  wherein on an outer circumference of the rotor, a groove portion recessed in a radial direction of the rotor is formed in a cross section perpendicular to the axial direction of the rotor,
  wherein the groove portion is formed in a V shape,
  wherein a ratio B/C, which is a ratio of the width B in the circumferential direction including the tooth portion and the stator protrusion portion with respect to a width C of the V shape in the circumferential direction, is within a range from 2.125 or more to 2.55 or less,
  wherein an angle formed by a virtual line connecting a bottom point of the groove portion and a center of the rotor and another virtual line connecting a magnetic pole center closest to the bottom point and the center of the rotor is an angle from 30% to 47% or less when an electric angle of 90 degrees is defined as 100%,
  wherein the tooth portion includes stator protrusion portions protruding to both sides in a circumferential direction of the rotor at a tip portion and holding a wound coil, and
  a width of the stator protrusion portion in the circumferential direction of the rotor is narrower at an inside of the radial direction than an outside of the radial direction.

6. The electric motor according to claim 5, wherein when a length of one of sides extending from a bottom point of the groove portion to an outer circumference of the rotor is set to a length between a and 1.2a, a depth from an outer circumference surface of the rotor to the bottom point is a depth between 0.3a or more and 0.4a or less.

7. The electric motor according to claim 5, wherein in a cross section perpendicular to the axial direction, an external angle formed by a virtual line perpendicular to a virtual line connecting a center of the tooth portion in the circumferential direction and a center of the rotor and a tangential line in contact with a side surface of the stator protrusion portion is 50 degrees or more and less than 90 degrees.

8. The electric motor according to claim 5, wherein a ratio B/A, which is a ratio of a width B in the circumferential direction including the tooth portion and the stator protrusion portions with respect to a width A of the tooth portion in the circumferential direction, is within a range from 1.25 or more to 1.35 or less.

9. The electric motor according to claim 5, wherein the tooth portion has a cross-sectional shape viewed along the stator axis, the cross-sectional shape comprising:
  a first side extending from an inner circumferential wall toward the stator axis;
  a second side opposite to the first side in a circumferential direction around the stator axis, the second side extending from the inner circumferential wall toward the stator axis;
  a first protrusion protruding from the first side in the circumferential direction, a length of the first protrusion in the circumferential direction decreasing toward the stator axis; and
  a second protrusion protruding from the second side in the circumferential direction, a length of the second protrusion in the circumferential direction decreasing toward the stator axis.

* * * * *